United States Patent [19]

Newberg et al.

[11] Patent Number: 5,365,525
[45] Date of Patent: Nov. 15, 1994

[54] METHOD FOR REDUCING BANDWIDTH OF A WIRELINE COMMUNICATION PATH

[75] Inventors: Donald G. Newberg, Schaumburg; Lawrence E. Feldman, Buffalo Grove, both of Ill.

[73] Assignee: Motorola, Inc., Schaumburg, Ill.

[21] Appl. No.: 982,344

[22] Filed: Nov. 27, 1992

[51] Int. Cl.$^5$ .............................................. G06F 11/00
[52] U.S. Cl. ...................................... 371/2.1; 371/5.1; 364/943.9; 375/122
[58] Field of Search .................. 371/2.1, 5.1, 20.1; 364/737, 943.9, 944.5, 946.1; 375/122

[56] References Cited

U.S. PATENT DOCUMENTS

| | | | |
|---|---|---|---|
| 3,599,155 | 8/1971 | McDowell et al. | 340/172.5 |
| 4,192,010 | 3/1980 | Kerner et al. | 364/900 |
| 4,375,581 | 3/1983 | Jayant | 371/31 |
| 4,386,416 | 5/1983 | Giltner et al. | 364/900 |
| 5,058,163 | 10/1991 | Lubarsky et al. | 364/200 |
| 5,200,962 | 4/1993 | Kao et al. | 371/41 |
| 5,285,458 | 2/1994 | Yoshida | 371/47.1 |

Primary Examiner—Kevin J. Teska
Assistant Examiner—Craig Steven Miller
Attorney, Agent, or Firm—Timothy W. Markison

[57] ABSTRACT

Within a fixed infrastructure of a communication system, message portions of code words that are found to be uncorrectable (erasures) are transmitted with a predetermined number of bits in place of the parity portion associated with those code words. These predetermined number of bits indicate the existence of the erasures, which can be reproduced for continued transmission to the final destination. By having the number of predetermined bits being less than the number of parity bits, the bandwidth requirement for wireline communication paths is reduced.

5 Claims, 1 Drawing Sheet

METHOD FOR REDUCING BANDWIDTH OF A WIRELINE COMMUNICATION PATH

FIELD OF THE INVENTION

This invention relates generally to communication systems and, in particular, to bandwidth reduction of a wireline communication path therein.

BACKGROUND OF THE INVENTION

Communication systems are known to comprise mobile transmitters and receivers, such as in-car mobile or hand-held portable radios, as well as fixed transmitters and receivers, such as base stations or repeaters (fixed end). The mobiles and fixed end are operably coupled by separate transmit and receive communication paths. The communication paths between the mobiles and the fixed end are typically wireless links, such as radio frequency (RF) channels. The communication paths between fixed transmitters and fixed receivers are typically wireline links, such as land-based phone lines.

A typical message within such a communication system may begin with a mobile unit converting an audio signal into a digital data stream suitable for transmission over an RF channel. This digital data is received via the RF channel by the fixed end where it is routed for retransmission, via an RF channel, to a second mobile. Finally, the second mobile is able to convert this digital data stream back into an audio signal, hence completing the message transmission. When information passed through such communication systems is represented digitally, the application of error correction codes is generally known.

Data transmitted through either an RF or wireline communication path is subject to the occurrence of errors. Errors occur as a result of noise or interference present in the communication path. There is an inherent minimum noise floor present within any communication path. Also, external phenomena may add to the noise level of a communication path. For instance, electrical storms can add noise to RF channels; crosstalk between closely aligned phone wires can create interference in wireline paths. Such errors, if allowed to pass through the entire communication system, cause degraded performance such as garbled audio signals at the message's final destination. The use of error correction codes offers substantial protection against such errors.

Error correction codes provide protection against errors by creating redundancy for the message being transmitted. This redundancy takes the form of additional bits added to the message, often called parity bits. Prior to transmission over a communication path, the bits of a message are passed through a known encoding function which generates a unique set of parity bits. A code word which comprises the message and its parity bits is then transmitted to the fixed receiver. The structure of the code word is dependant upon the application. For instance, the parity bits may be interleaved with the message or appended to the end of the message.

The fixed receiver passes the code word through a decoding function (essentially the inverse of the encoding function) to determine if any errors have occurred in the message. The decoding function typically has the capabilities to determine how many errors, if any, have occurred in the message and to correct these errors, if possible. If the number of errors in the message is less than or equal to the error correction code's capability to correct, the errors are corrected and normal processing of the message continues. If, however, more errors are detected than the error correction code is capable of correcting, the message is considered uncorrectable (often called an erasure). The handling of erasures by the fixed receiver is dependant upon the application. For instance, in a voice communication system, it may be appropriate to replace the erasure with the most recent error-free message. This error correction procedure can be repeated over each communication path in the system. Communication links that utilize error correction, however, suffer a reduction in information capacity which is proportional to the complexity of, and hence the amount of redundancy provided by, the error correction method. Generally, error correction methods which offer a higher capability for detecting and correcting errors also require a larger portion of the available data bandwidth.

It is generally known that the error rate performance of a wireline link is typically superior to the error rate performance of a wireless link. Code words produced for transmission via a wireless link typically possess higher error protection requirements than are required for transmission via a wireline link. Such code words that are subsequently re-transmitted over a wireline link occupy a portion of the wireline's available data bandwidth that is larger than necessary. Therefore, a need exists for a method which offers the advantages of error correction within a communication system without over utilization of the available data bandwidth in a wireline link.

DESCRIPTION OF A PREFERRED EMBODIMENT

Figure 1:
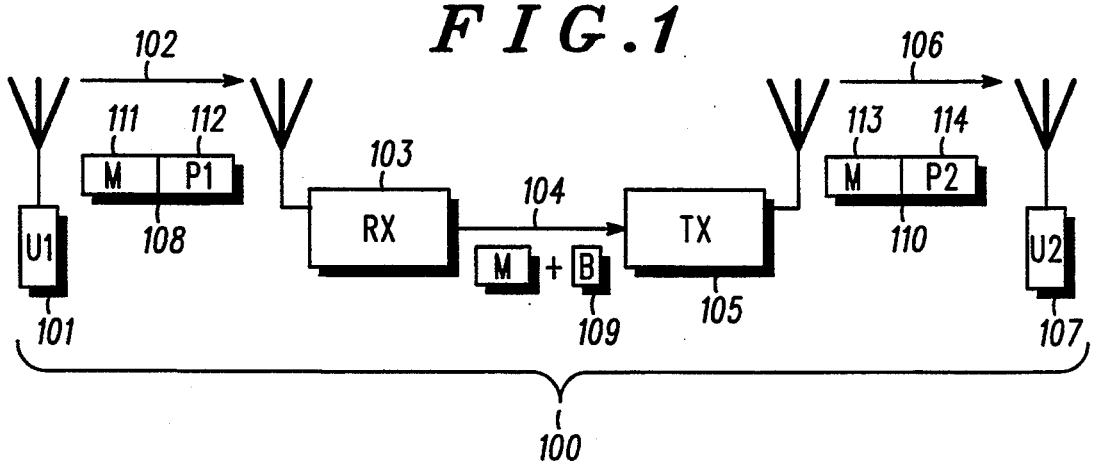
FIG. 1 illustrates a communication system in accordance with the present invention.

FIG. 1 illustrates a communication system 100 that comprises a first communication unit 101, a receive wireless communication path 102, a fixed receiver 103, a wireline communication path 104, a fixed transmitter 105, a transmit wireless communication path 106, a second communication unit 107, a transmitted code word 108, a predetermined number of bits 109, and an error code word 110. The first communication unit 101 and second communication unit 107 may comprise hand-held portable or in-car mobile radios. The fixed receiver 103 and the fixed transmitter 105 may comprise a base station or repeater. The transmitted code word 108 and error code word 110 may comprise code words generated by using a linear block code such as a Golay(24,12).

In the communication system 100, a communication is initiated when the first communication unit 101, using a known error correction method, such as a Golay(24,12), transmits a transmitted code word 108 via a receive wireless communication path 102 to the fixed receiver 103. The transmitted code word 108 comprises a message portion 111 and a parity portion 112. It is understood that the error correction method used may comprise any code which allows for the detection of uncorrectable code words, dependent upon the application. Upon reception of the transmitted code word 108, the receiver 103 will determine if there are any errors in the message portion 111 of the transmitted code word 108, and if so, whether or not they are correctable.

If the transmitted code word 108 is uncorrectable (hereafter referred to as the erasure), the predetermined number of bits 109 are set to ones and transmitted along with the message portion 111 of the erasure to the transmitter 105 via the wireline communication path 104. It is understood that the predetermined number of bits 109 may be set to any known pattern to indicate the presence of an erasure. In the best mode, the predetermined number of bits 109 is a single bit, however, any number of bits up to the number of bits in the parity portion 112 may be used to reduce the bandwidth requirement. By choosing the length of the predetermined number of bits 109 to be less than the length of the parity portion 112 of the transmitted code word 108, the amount of data bandwidth required to transmit the status of each code word via the wireline communication path 104 is reduced.

Upon detecting that the predetermined number of bits 109 are set to ones, the fixed transmitter 105 generates an error code word 110, which comprises a message portion 113 and a parity portion 114, in such a manner that it is known to be an erasure. For example, when a Golay(24,12) code is utilized, the error code word 110 is synthesized by re-encoding the message portion 111 received via the wireline communication path 104 and exclusive-or'ing the resultant code word with the error pattern 000000000000000100100110 (assuming the parity portion is appended to the end of the message portion). Finally, the error code word 110 is transmitted by the fixed transmitter 105 to the second communication unit 107 via the transmit wireless communication path 106.

If the transmitted code word 108 is uncorrupted or correctable, the predetermined number of bits 109 are set to zeroes and transmitted along with the message portion 111 to the transmitter 105 via the wireline communication path 104. Upon detecting that the predetermined number of bits 109 are set to zeroes, the fixed transmitter 105 re-encodes the message portion 111 and transmits the resultant code word to the second communication unit 107 via the transmit wireless communication path 106.

Figure 2:
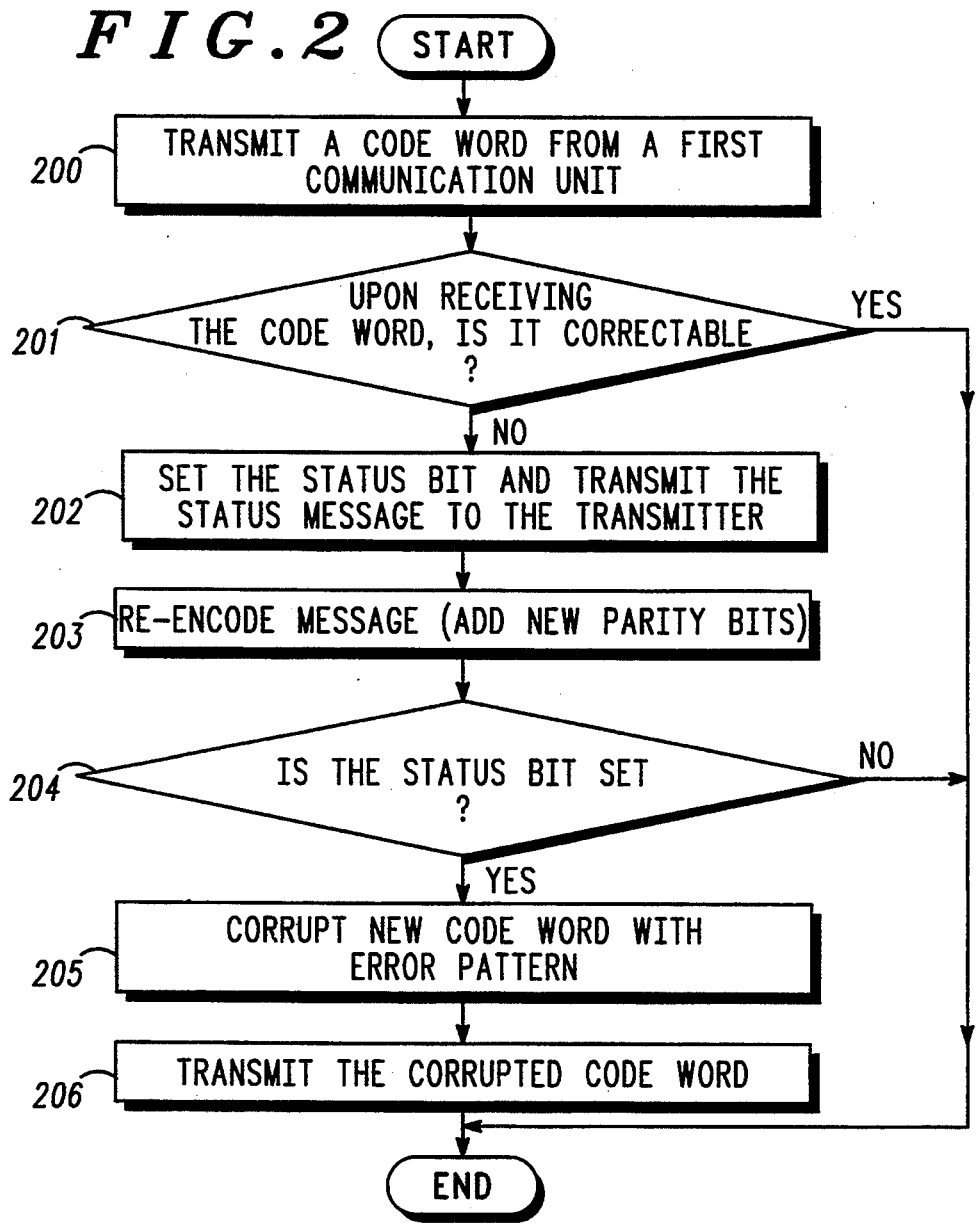
FIG. 2 illustrates a flow chart that may be utilized to implement the present invention.

FIG. 2 illustrates a flow chart stored in memory (not shown) and executed by processing units (not shown) within the fixed receiver 103 and the fixed transmitter 105 which describes a procedure by which the present invention handles erasures. At step 200, the first communication unit 101 generates a code word. Once the code word is received, the fixed receiver 103 determines if an erasure has occurred. At step 201, the decoding function within the fixed receiver 103 determines if the number of errors, if any, occurring in the code word is less than the error correction code's capability to correct. If the number of errors detected is less than or equal to the error correction code's capability to correct, they are corrected and the procedure shown in FIG. 2 is terminated. If the number of errors detected is greater than the error correction code's capability to correct, the message is considered uncorrectable. If uncorrectable, the fixed receiver 103 sets a status bit to one and transmits it, along with the message portion, to the fixed transmitter 105 via the wireline communication path 104. Once the fixed transmitter 105 receives the message portion and the status bit, it adds a new parity portion to the message portion, creating a new code word, using the identical error correction method as that used in the first communication unit 101. This new parity portion is functionally equivalent to that which was not sent by the receiver 103 in step 202. Step 204, executed within the fixed transmitter 105, checks if the status bit associated with the message portion of the new code word is set to one or zero. If the status bit is set to zero, the procedure shown in FIG. 2 is terminated. If the status bit is set to one, step 205 corrupts the new code word with a known error pattern such that an erasure is guaranteed to result. It is understood that there exists a plurality of such error patterns, dependant upon the error correction method used. For instance, if a Hamming(10,6) code is used instead of the Golay(24,12) code discussed previously, an acceptable error pattern could be 0000001001 (assuming the parity portion is appended to the end of the message portion). Step 206 concludes the procedure by transmitting this erasure from the fixed transmitter 105 to the second communication unit 107. Within the second communication unit 107, the erasure may be handled in a number of ways. For instance, it may be acceptable for the second communication unit 107 to replace any received error code words 110 with the most recently received non-error code word.

The present invention utilizes the fact that the status of error corrected messages in a communication system can be classified as either correctable or uncorrectable. This status is represented as a single status bit over the more reliable wireline communication path. This single bit requires less data bandwidth through the wireline communication path than would be required if the parity portion of the message were used for the same purpose. As an example, if a k-bit message is error encoded to yield an n-bit code word where $k<n$, the channel needs required to transmit this code word through the wireline communication path can be reduced by a factor of $(k+1)/n$. Thus, the present invention reduces the required bandwidth of wireline links within the fixed end.

We claim:

1. In a communication system that includes a plurality of communication units, a receive wireless communication path, a transmit wireless communication path, at least one receiver that is operably coupled to the receive communication path, and a transmitter that is operably coupled to the transmit wireless communication path, wherein the transmitter is operably coupled to the receiver via a wireline communication path, a method for labeling uncorrectable transmitted code words and reducing bandwidth, the method comprises the steps of:

a) transmitting, by a first communication unit of the plurality of communication units, a code word via the receive wireless communication path to the receiver to produce a transmitted code word;

b) detecting, by the receiver, that the transmitted code word is uncorrectable to produce an uncorrectable code word;

c) setting, by the receiver, a predetermined number of bits to indicate that the transmitted code word is uncorrectable;

d) transmitting, by the receiver to the transmitter via the wireline communication path, at least the predetermined number of bits, said uncorrectable code word and predetermined number of bits being less in length than said code word;

e) generating, by the transmitter, an error code word;

f) transmitting, by the transmitter via the transmit wireless communication path to at least a second communication unit, the error code word.

2. In the method of claim 1, step (d) further comprises transmitting, by the receiver to the transmitter via the wireline communication path, a message portion of the transmitted code word.

3. In the method of claim 2, step (e) further comprises:
   re-encoding, by the transmitter, the message portion of the transmitted code word to produce a temporary code word; and
   modifying, by the transmitter, the temporary code word with a predetermined error pattern to produce the error code word.

4. In a communication system that includes a plurality of communication units, a receive wireless communication path, a transmit wireless communication path, at least one receiver that is operably coupled to the receive communication path, and a transmitter that is operably coupled to the transmit wireless communication path, wherein the transmitter is operably coupled to the receiver via a wireline communication path, a method for reducing bandwidth requirements of the wireline communication path, the method comprises the steps of:
   a) encoding, by a first communication unit, a code word that includes a message portion and a parity portion;
   b) transmitting, by the first communication unit, the code word to the receiver via the receiver wireless communication path;
   c) determining, by the receiver, that the code word is corrupt to produce an uncorrectable code word;
   d) setting, by the receiver, a predetermined number of bits to indicate that the code word is uncorrectable, said predetermined number of bits being less in length than said parity portion; and
   e) transmitting, by the receiver to the transmitter via the wireline communication path, only the message portion and the predetermined number of bits.

5. In a communication system that includes a plurality of communication units, a receive wireless communication path, a transmit wireless communication path, at least one receiver that is operably coupled to the receive communication path, and a transmitter that is operably coupled to the transmit wireless communication path, wherein the transmitter is operably coupled to the receiver via a wireline communication path, a method for reducing bandwidth requirements of the wireline communication path, the method comprises the steps of:
   a) receiving, by the receiver, a code word that is uncorrectable to produce an uncorrectable code word, wherein the code word includes a message portion and a parity portion, said predetermined number of bits being less in length than said parity portion;
   b) setting, by the receiver, a predetermined number of bits to indicate that the code word is uncorrectable; and
   c) transmitting, by the receiver to the transmitter via the wireline communication path, only the message portion and the predetermined number of bits.

* * * * *